US009716652B2

(12) United States Patent
Kampmann et al.

(10) Patent No.: US 9,716,652 B2
(45) Date of Patent: Jul. 25, 2017

(54) HANDLING OF DATA TRANSFERS IN A NETWORK WITH A RING TOPOLOGY

(75) Inventors: Dirk Kampmann, Vaals (NL);
Christoph Meyer, Herzogenrath (DE);
Andreas Witzel, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 14/381,309

(22) PCT Filed: Mar. 5, 2012

(86) PCT No.: PCT/EP2012/053763
§ 371 (c)(1),
(2), (4) Date: Aug. 27, 2014

(87) PCT Pub. No.: WO2013/131554
PCT Pub. Date: Sep. 12, 2013

(65) Prior Publication Data
US 2015/0103830 A1    Apr. 16, 2015

(51) Int. Cl.
*H04L 12/741* (2013.01)
*H04L 12/42* (2006.01)
(Continued)

(52) U.S. Cl.
CPC ............ *H04L 45/74* (2013.01); *H04L 12/42* (2013.01); *H04L 12/462* (2013.01); *H04L 45/64* (2013.01)

(58) Field of Classification Search
CPC ...................................... H04L 12/42
(Continued)

(56) References Cited

U.S. PATENT DOCUMENTS 5,490,139 A * 2/1996 Baker ............... H04L 45/00
370/312
5,699,356 A * 12/1997 Beever ............. H04J 3/1682
370/329
(Continued)

FOREIGN PATENT DOCUMENTS

EP   1 528 731 A2   5/2005
EP   1 672 851 A1   6/2006
EP   1 780 960 A2   5/2007

OTHER PUBLICATIONS

International Search Report for International Application No. PCT/EP2012/053763 mailed Jun. 15, 2012, 5 pages.
(Continued)

*Primary Examiner* — Andrew Lai
*Assistant Examiner* — Andrew C Lee
(74) *Attorney, Agent, or Firm* — Sage Patent Group (57) ABSTRACT

A method for handling, by a ring node of a network having a ring topology, a data transfer of data packets through the network via which the data packets are transmitted to their destination node, wherein each ring node has two neighboring ring nodes. The method includes detecting data packets of an incoming data transfer received from a non ring node to be transmitted through the network to their destination node. Furthermore, a ring direction is added to the data packets of the incoming data transfer, the indication indicating in which direction the data packets of the incoming data transfer are passed through the network having the ring topology. The data packets of the incoming data transfer are forwarded to one of the two neighboring ring nodes based on the added indication.

14 Claims, 11 Drawing Sheets

(51) Int. Cl.
*H04L 12/46* (2006.01)
*H04L 12/715* (2013.01)

(58) Field of Classification Search
USPC ............... 370/392, 395, 222, 223, 403, 406
See application file for complete search history.

(56) References Cited

U.S. PATENT DOCUMENTS

| | | | | |
|---|---|---|---|---|
| 6,122,250 | A * | 9/2000 | Taniguchi | H04L 12/437 370/222 |
| 6,154,462 | A * | 11/2000 | Coden | H04L 12/42 370/258 |
| 6,584,535 | B1 * | 6/2003 | Ouellet | H04L 47/10 370/223 |
| 6,594,232 | B1 * | 7/2003 | Dupont | H04L 12/437 370/222 |
| 6,639,896 | B1 * | 10/2003 | Goode | H04L 29/06027 370/223 |
| 6,680,912 | B1 * | 1/2004 | Kalman | H04J 3/085 370/238 |
| 6,711,125 | B1 * | 3/2004 | Walrand | H04L 12/5601 370/223 |
| 6,785,285 | B1 * | 8/2004 | Romana | H04Q 11/0478 370/395.1 |
| 7,212,490 | B1 * | 5/2007 | Kao | H04L 12/42 370/222 |
| 7,545,735 | B1 * | 6/2009 | Shabtay | H04L 1/22 370/217 |
| 2001/0003833 | A1 * | 6/2001 | Tomizawa | H04J 3/085 709/240 |
| 2001/0015979 | A1 * | 8/2001 | Hata | H04J 3/085 370/403 |
| 2002/0024931 | A1 * | 2/2002 | Chikazawa | H04L 1/22 370/228 |
| 2003/0012131 | A1 * | 1/2003 | Venema | H04L 12/437 370/222 |
| 2003/0058790 | A1 * | 3/2003 | Nagamine | H04J 3/085 370/222 |
| 2003/0108029 | A1 * | 6/2003 | Behzadi | H04L 12/437 370/351 |
| 2003/0117946 | A1 * | 6/2003 | Fontana | H04L 12/437 370/216 |
| 2004/0160904 | A1 * | 8/2004 | Enomoto | H04L 12/462 370/256 |
| 2004/0252688 | A1 * | 12/2004 | May | H04L 12/42 370/389 |
| 2005/0135804 | A1 * | 6/2005 | Rashid | H04L 45/30 398/4 |
| 2005/0243845 | A1 * | 11/2005 | Higashitaniguchi | H04L 12/437 370/404 |
| 2005/0271035 | A1 * | 12/2005 | Cohen | H04L 12/18 370/351 |
| 2006/0109802 | A1 * | 5/2006 | Zelig | H04L 12/42 370/258 |
| 2007/0206618 | A1 * | 9/2007 | Zelig | H04L 12/4637 370/404 |
| 2007/0237072 | A1 * | 10/2007 | Scholl | H04L 12/66 370/222 |
| 2007/0268821 | A1 * | 11/2007 | Levit | H04L 12/42 370/223 |
| 2008/0080367 | A1 * | 4/2008 | Fujii | H04L 45/28 370/223 |
| 2008/0170657 | A1 * | 7/2008 | Peeters | A61B 6/4441 378/16 |
| 2008/0259920 | A1 * | 10/2008 | Cheng | H04L 12/437 370/390 |
| 2008/0285442 | A1 * | 11/2008 | Bruckman | H04L 1/22 370/225 |
| 2009/0016384 | A1 * | 1/2009 | Cheng | H04J 3/0641 370/512 |
| 2009/0201806 | A1 * | 8/2009 | Ding | H04L 45/00 370/225 |
| 2009/0207727 | A1 * | 8/2009 | Zeng | H04J 3/1652 370/216 |
| 2010/0110881 | A1 * | 5/2010 | Ryoo | H04L 12/42 370/225 |
| 2010/0195649 | A1 * | 8/2010 | Miyata | H04L 12/42 370/390 |
| 2010/0214909 | A1 * | 8/2010 | Ceccarelli | H04L 12/437 370/228 |
| 2010/0226244 | A1 * | 9/2010 | Mizutani | H04L 12/1863 370/220 |
| 2010/0238813 | A1 * | 9/2010 | Allan | H04L 12/437 370/252 |
| 2010/0246387 | A1 * | 9/2010 | Krishnan | H04L 12/437 370/225 |
| 2010/0260196 | A1 * | 10/2010 | Holness | H04L 12/427 370/406 |
| 2010/0278040 | A1 * | 11/2010 | He | H04L 12/42 370/222 |
| 2010/0287405 | A1 * | 11/2010 | Soon | H04L 43/0817 714/4.1 |
| 2011/0007628 | A1 * | 1/2011 | Tochio | H04L 12/437 370/224 |
| 2011/0058560 | A1 * | 3/2011 | Okita | H04L 12/4637 370/395.53 |
| 2011/0170406 | A1 * | 7/2011 | Krishnaswamy | H04L 41/0677 370/222 |
| 2012/0140679 | A1 * | 6/2012 | Inaba | H04L 12/437 370/258 |

OTHER PUBLICATIONS

Written Opinion of the International Searching Authority for International Application No. PCT/EP2012/053763 mailed Jun. 15, 2012, 11 pages.
Yang et al: "Forwarding and Control Element Separation (ForCES) Framework; rfc3746.txt" Apr. 1, 2004, XP015009526, ISSN: 0000-0003; http://www.rfc-editor.org/rfc/pdfrfc/rfc3746.txt.pdf.
ITU-T G.8032/Y.1344 (Mar. 2010) "Ethernet ring protection switching", Telecommunication Standardization Sector of ITU; Series G: Transmission Systems and Media, Digital Systems and Networks; Series Y: Global Information Infrastructure, Internet Protocol Aspects and Next-Generation Networks; Recommendation ITU-T G.8032/Y.1344; Switzerland, Geneva, 2010; http://www.itu.int/rec/T-REC-G.8032-201003-I.
ITU-T Y.1731 (Feb. 2008) "OAM functions and mechanisms for Ethernet based networks", Telecommunication Standardization Sector of ITU; Series Y: Global Information Infrastructure, Internet Protocol Aspects and Next-Generation Networks; Recommendation ITU-T Y.1731; Switzerland, Geneva, 2009; http://www.itu.int/rec/T-REC-Y.1731-200802-I.
"OpenFlow Switch Specification" Version 1.1.0 Implemented (Wire Protocol 0x02) Feb. 28, 2011; 56 pages; http://archive.openflow.org/documents/openflow-spec-v1.1.0.pdf.
D. Katz et al.: "Bidirectional Forwarding Detection (BFD)" rfc 5880.txt; Standards Track; Jun. 2010; ISSN: 2070-1721; 49 pages; http://tools.ietf.org/pdf/rfc5880.pdf.
IEEE Std 802.1ag™-2007: IEEE Standard for Local and metropolitan area networks—Virtual Bridged Local Area Networks; Amendment 5: Connectivity Fault Management; Sponsored by the LAN/MAN Standards Committee; New York, NY; Dec. 17, 2007.
IEEE Std 802.3ah™-2004: IEEE Standard for Information technology—Telecommunications and information exchange between systems—Local and metropolitan area networks—Specific requirements; Part 3: Carrier Sense Multiple Access with Collision Detection (CSMA/CD) Access Method and Physical Layer Specifications; Amendment : Media Access Control Parameters, Physical Layers, and Management Parameters for Subscriber Access Networks; Sponsored by the LAN/MAN Standards Committee; New York, NY; Sep. 7, 2004.

* cited by examiner

HANDLING OF DATA TRANSFERS IN A NETWORK WITH A RING TOPOLOGY

CROSS REFERENCE TO RELATED APPLICATION

This application is a 35 U.S.C. §371 national stage application of PCT International Application No. PCT/EP2012/053763, filed on 5 Mar. 2012, the disclosure and content of which is incorporated by reference herein in its entirety. The above-referenced PCT International Application was published in the English language as International Publication No. WO 2013/131554 A1 on 12 Sep. 2013.

The present invention relates to a method for handling, by a ring node of a network having a ring topology, a data transfer of data packets, to the ring node of the network with the ring topology, to a central control entity controlling a topology change in the network with the ring topology and to a method for controlling a topology change by the central control entity.

BACKGROUND

Today's Mobile Backhaul (MBH) networks are usually structured into two parts, the High-RAN (Radio Access Network) and Low-RAN sections in order to provide connectivity and traffic aggregation for mobile packet data from the cell sites to the core network.

Figure 1:
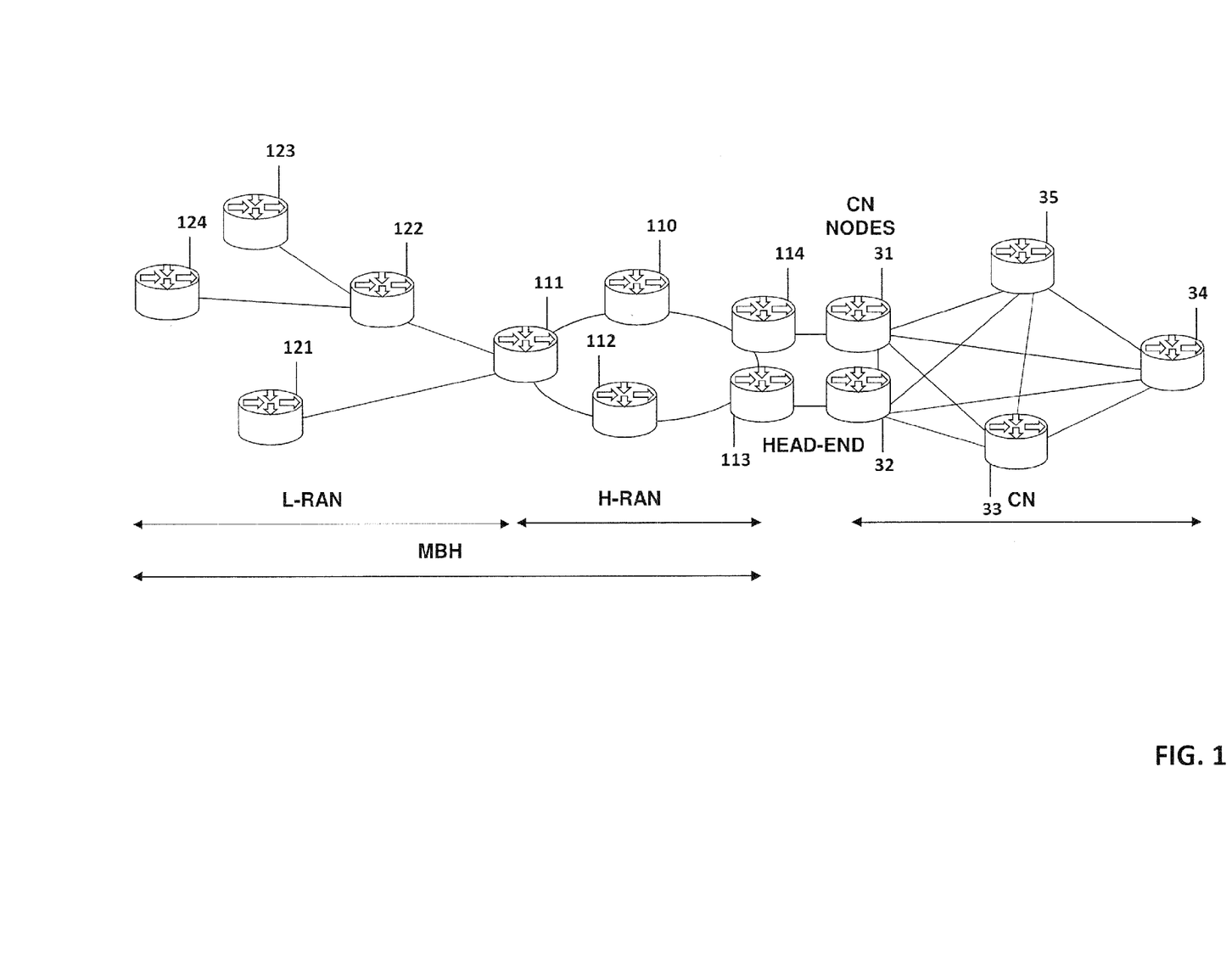
FIG. 1 shows a typical network topology of a mobile backhaul network.

As can be seen from FIG. 1 the High-RAN part is typically using a ring topology with the network nodes 110 to 114, while the Low-RAN part is using a tree-structure with the network nodes 121 to 124. The cell sites are connected to the Low-RAN. The Low-RAN is typically using microwave links to the access legs of the High-RAN ring. The head-end of the High-RAN ring connects to the core network using core routers, such as routers 31 and 32 placed on the core site. The edge router connects as well to the core network CN via at least two independent links as shown in FIG. 1.

Figure 2:
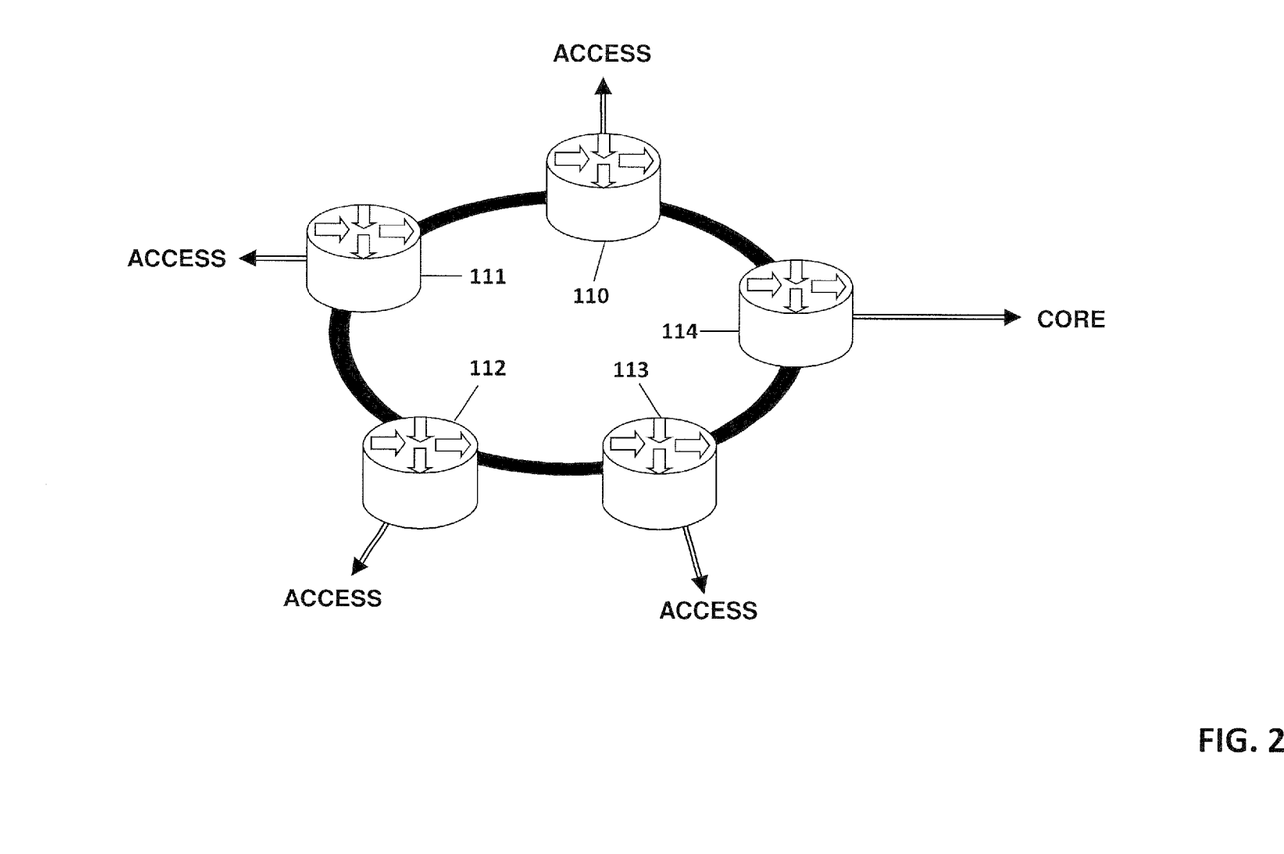
FIG. 2 shows a network with a ring topology as known in the art.

A ring topology is a standard topology used in current transport network design. In this topology multiple transport nodes are interconnected to each other in the shape of a ring. As show in FIGS. 1 and 2, a ring topology comprises three or more ring nodes 110-114. Each node in the ring has two neighbouring ring nodes and the ring nodes 110-114 may be connected to other nodes in order to support traffic insertion into or extraction from the ring topology.

Ring topologies are used with various transport technologies, by way of example optical transport networks (OTN) or electrical transport networks based on SDH (Synchronous Digital Hierarchy), ATM (Asynchronous Transfer Mode) or Ethernet standards.

Furthermore, a split router architecture is known, a concept which is currently being discussed and under development in various groups, for example in the Forwarding and Control Entity Separation (ForCes) Working Group in IETF (http://datatracker.ietf.org/wg/forces/), the group developing the OpenFlow Protocol, OpenFlow Switch Specification, Version 1.1.0, http://www.openflow.org/ or the recently created Open Network Foundation group, Open Network Foundation website, http://www.opennetworkfoundation.org/.

The split router architecture proposes to split a common router in two elements: a control element (CE) responsible for managing the routing protocol and the connectivity of the data plane. A control element controls the data plane connectivity through a forwarding element (FE). The forwarding element is responsible for forwarding traffic in the data plane and establishes connectivity to a neighbour node based on the instructions received from the control element.

Figure 3:
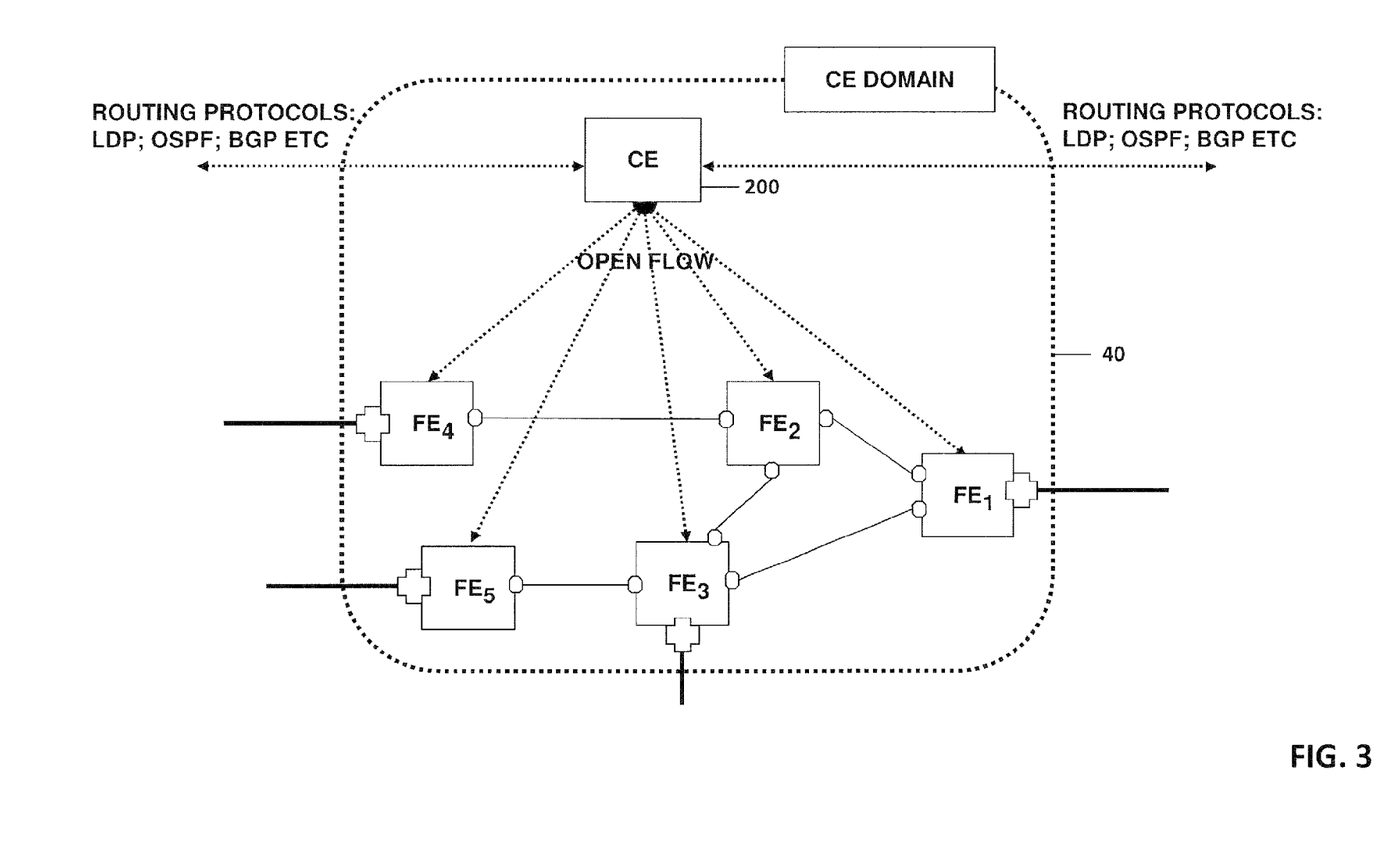
FIG. 3 shows a split router architecture with a central control entity controlling forwarding elements as known in the art.

The control element controls a set of at least one FE nodes forming a transport network. FE nodes are connected to each other by transport links between so-called internal ports. FE nodes are connected to nodes outside of the CE-controlled transport network (CE Domain) by so-called external ports. This is shown in further detail in FIG. 3 where a central control entity 200 controls the forwarding elements $FE_1$ to $FE_5$ using a protocol such as OpenFlow. The area controlled by the central control entity 200 is shown by the dashed line 40. Nodes outside this area can utilize the transport services of the CE-controlled network by sending flows to external FE ports, the ports shown by crosses in the embodiment of FIG. 3. The flows contain identifications recognized by the CE 200. The transport service of the CE-controlled transport network is either preconfigured or is configured on the fly by the CE 200 based on the incoming flow identifications. In the embodiment of FIG. 3 the forwarding elements $FE_1$ to $FE_3$ may play the role of the ring network, whereas $FE_4$ and $FE_5$ are forwarding elements, such as forwarding elements 21 and 22 of FIG. 4 on the Low-RAN side.

Figure 4:
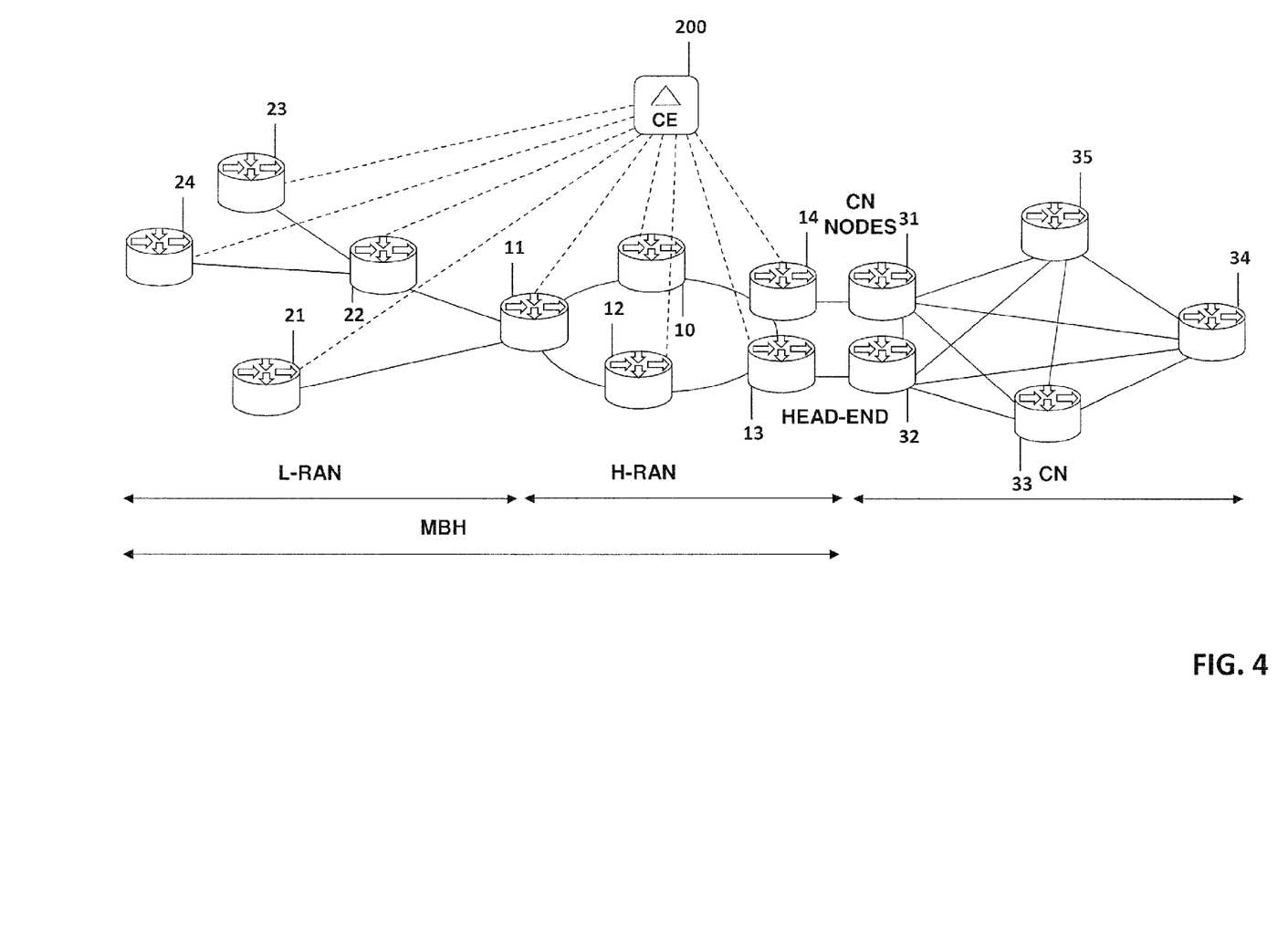
FIG. 4 shows the network topology of FIG. 1 with a split router architecture.

In FIG. 4 it is shown how the split router architecture on the mobile backhaul is applied. In the embodiment of FIG. 4 the elements containing the nomination FE are forwarding elements such as the forwarding elements 21 to 24 of the Low-RAN and the forwarding elements 10 to 14 in the High-RAN, whereas the other nodes 31 to 35 without the nomination FE are routers. The dashed lines indicate the control plane flow, whereas the solid lines indicate the data plane flow. Between the routers in the CN 31 to 35 control plane flow has not been depicted.

Ethernet is a widely used transport standard that specifies the physical transport layer and part of the data link layer, for example addressing. A ring topology using the Ethernet standard causes some complications. Ethernet and partly protocols above Ethernet provide automatic data path detection and selection. Those protocols must ensure that data are not sent in a loop. Various protocols are proposed to provide loop detection and loop prevention, for example the Spanning Tree Protocol, STP, and improved variants of this protocol like Rapid Spinning Tree Protocol, rSTP. These protocols provide a slow failure detection and failure handling in case a link breaks or a node fails. This failure detection and handling is in the order of seconds, this slow handling is not comparable with fail-over times achieved with the SDH (Synchronous Digital Hierarchy) technology where the failure detection handling is in the order of 50 milliseconds. A new procedure was developed in ITU-T to improve the fail-over time for Ethernet ring topology: the Ethernet ring protection switching, ITU-I G.8032/Y. 1344, Ethernet ring protection switching, http://www.itu.int/rec/T-REC-G.8032-201003-I.

This specification proposes the Ring Automatic Protection Switching (R-APS) protocol to manage the connectivity and node availability in the Ethernet ring. Further functionality defined in the ITU-T recommendation "OAM functions and mechanisms for Ethernet based networks", ITU-T Y.1731, OAM functions and mechanisms for Ethernet based networks, http://www.itu.int/rec/T-REC-Y.1731-200802-I is used to monitor the availability of links immediately connected to a node.

While OAM (Operations Administration and Maintenance) functions are used in each node to monitor the availability of the directly connected links, the R-APS protocol is used to exchange this information between all nodes in the ring. Finally, each node receives an overview of the availability of links and nodes in the ring. In case of failure, independent decisions are taken in each node to find an alternative route for the traffic bypassing the failed link or node.

Figure 5:
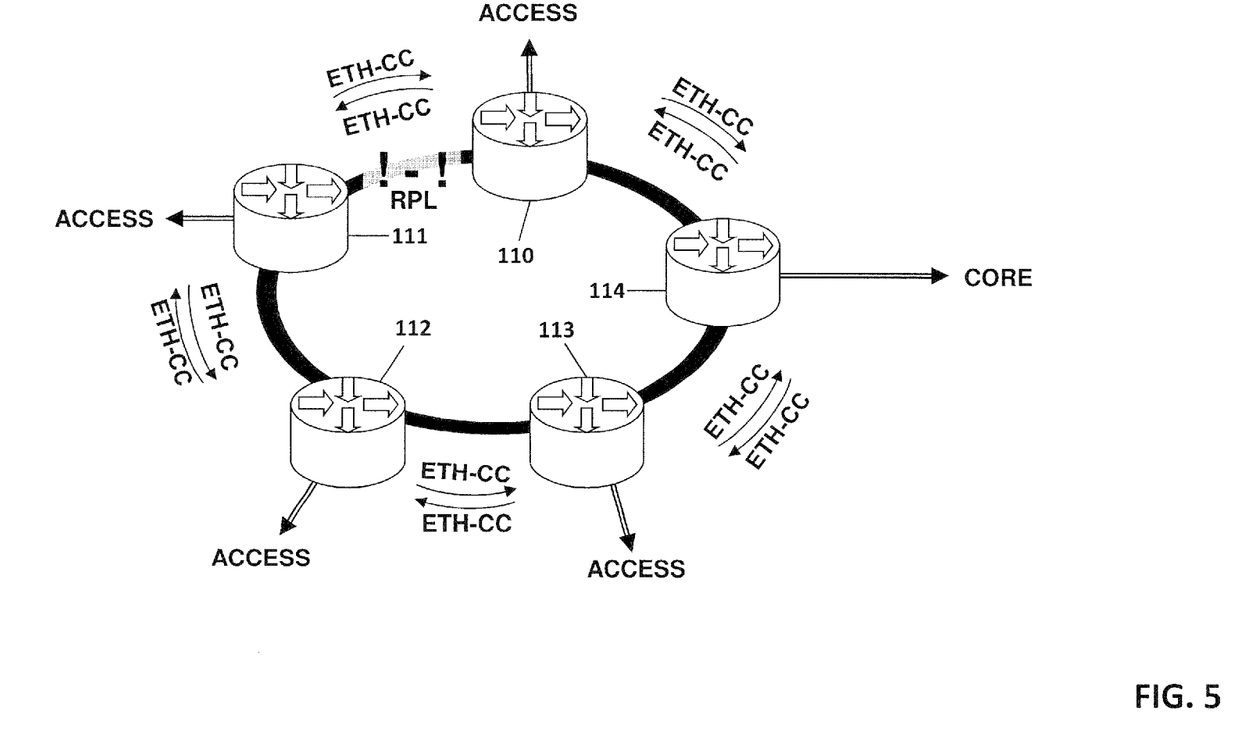
FIG. 5 shows an Ethernet ring protection based on G.8032.

The concept of the Ethernet protocols used to prevent Ethernet loops is shown in FIG. 5 and a closed dedicated link for data traffic. This applies for STP, its variants and Ring Automatic Protection Switching (R-APS). In G.8032 the disabled link is called ring protection link, RPL. Ethernet OAM traffic can still pass through the RPL to monitor the link availability but other traffic is prohibited. In the embodiment shown in FIG. 5, the link between ring nodes 110 and 111 is disabled and thus plays the role of the ring protection link in the example shown in FIG. 5.

As a consequence, the traffic cannot take the shortest path in all cases. By way of example, traffic from ring node 110 to ring node 111 has to pass through 114, 113 and 112 as the direct connection to ring node 111 is disabled. The ring protection link impacts the overall transport capacity that can be achieved in the Ethernet ring topology.

Because it is not easy to overcome this situation, the approach in Ethernet based networks is to run each transport node independently from one another. Each node detects the network topology by means of specific topology detection protocols. Based on information gained, each node makes an independent decision based on a common decision model to decide on how to route traffic in a network. The final model shall ensure that the final data paths are always loop-free.

Another drawback is the number of transport labels needed in a MBH to cope also with failover cases. This is a problem for split MBH networks using the split router architecture mentioned above.

Figure 6:
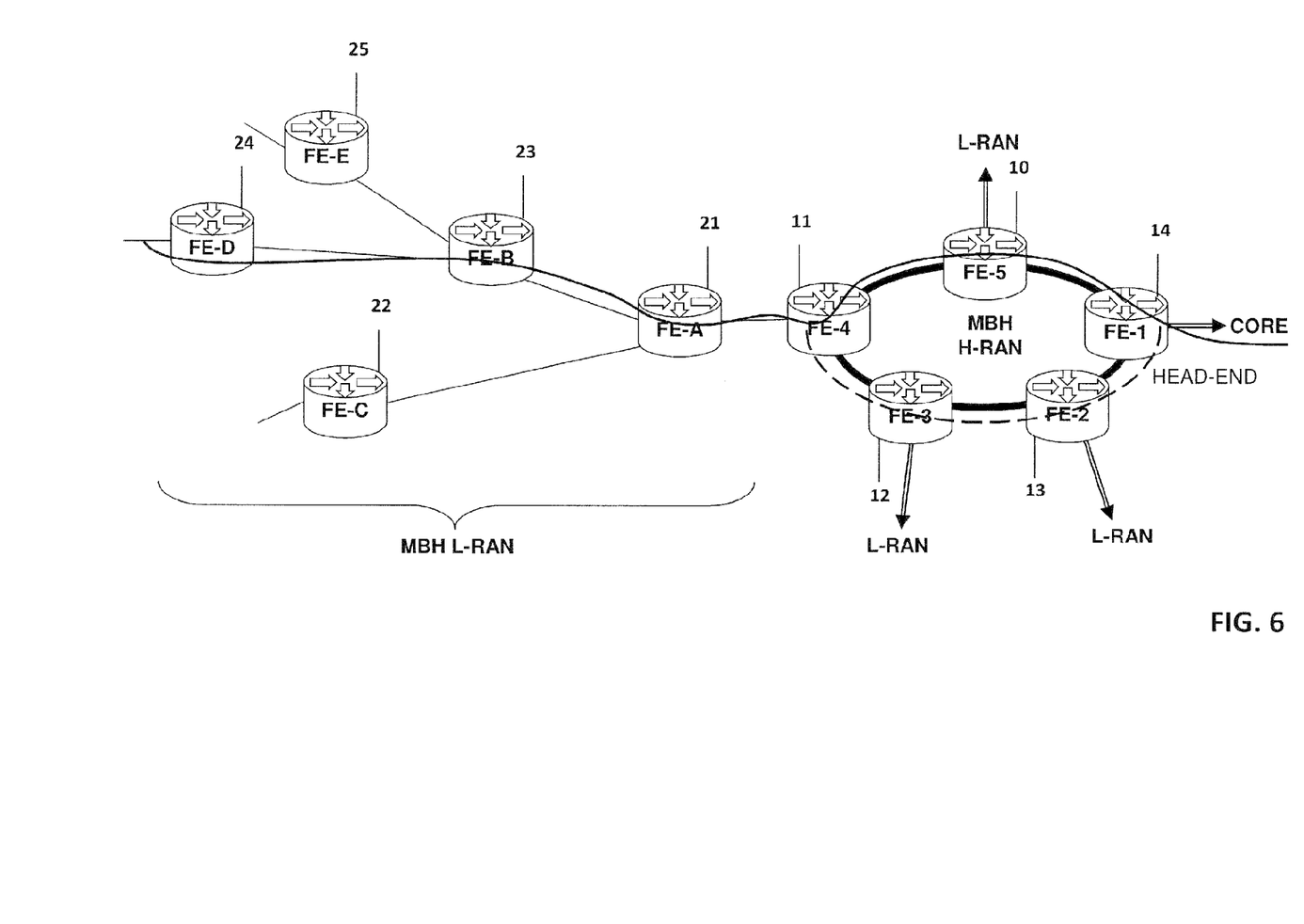
FIG. 6 shows a mobile backhaul transport tunnel with an alternative path.

A typical deployment scenario is that transport paths (e.g. Multiprotocol Label Switching (MPLS) tunnels, or VLANs) are configured from any access leave of the L-RAN tree to the head-end interface towards the core network as shown in FIG. 6. In order to cater for failure cases in the HRAN ring, the alternative ring label via FE-3 and FE-2 shown in the dashed line needs to be utilized. If e.g. an MPLS mechanism is used, a label swap would be applied at the FE next to the failed link. However, this implies that for each label, which identifies an end point within the MBH, an alternative label needs to be preconfigured. In MBH networks with a plurality of nodes this implies an important administrative effort and the size of the MBH network is limited by the range of possible MPLS labels, divided by two. This implies a hard limitation in the design of MBH. The number of required MPLS labels can be calculated in the following way: the number of labels corresponds to the number of LRAN leaves x 2. As for each LRAN leave towards head-end MPLS tunnel one label for the normal situation and one label for the failure situation is required, the number of labels increases with the number LRAN leaves. If more than one ring is present and traversed in the HRAN, the number of labels doubles with each traversed ring structure. This means that the number of labels corresponds to the number of LRAN leaves x 2 x the number of traversed rings.

The above problem does not only exist in MBH networks but also in other networks such as Metropolitan Area Networks, converged mobile aggregation networks, or Virtual Local Area Networks (VLAN).

SUMMARY

Accordingly, a need exists to avoid problems with the size of networks in view of the range of possible labels. This need is met by the features of the independent claims. In the dependent claims further embodiments are described.

According to a first aspect of the invention a method for handling, by a ring node of a network having a ring topology, a data transfer of data packets through the network is provided via which the data packets are transmitted to their destination node, wherein each ring node has two neighbouring ring nodes. The ring node detects data packets of an incoming data transfer received from a non-ring node wherein the data packets should be transmitted through the ring network to their destination node. An indication of a ring direction is added to the data packets of the incoming data transfer, wherein the indication of the ring direction indicates in which direction the data packets of the data transfer are passed through the network having the ring topology. Furthermore, the data packets of the incoming data transfer are forwarded to one of the two neighbouring ring nodes based on the added indication.

By adding the indication, i.e. a direction information how the data packets should be transmitted through the ring network, the administration effort and the problem of the size of the mobile backhaul network is avoided.

The indication of the ring direction may indicate whether data packets of the incoming data transfer should pass the network with the ring topology in a clockwise or counter-clockwise direction. As two directions in a ring topology are possible, the indication indicates whether the data packets of a data transfer should be transferred, when entering the ring, in one direction or the opposite direction. The data packets are forwarded to the neighbouring ring node in accordance with the allocated indication.

Furthermore, the ring node may balance the load of its neighbouring ring nodes. When a plurality of incoming data transfers is detected by the ring node, a first one of the indications may be added to the data packets of one of the plurality of incoming data transfers, and the other one of the indications can then be added to the data packets of the data transfer directly following after said one incoming data transfer. This alternating distribution of data transfers can help to equilibrate the load of the different ring nodes.

Furthermore, it is possible that the ring nodes of the ring network remove the added indication when the data packets of a data transfers leave the ring topology. When data packets of one data transfer including the indication are received from a neighbouring ring node, it is possible to check, based on the destination information included in the data packets, whether the data packets of said one data transfer should be passed to the other neighbouring ring node or not. If the data packets should not be passed to the other neighbouring ring node, the added indication is removed and the data packets of said one data transfer are passed to a non-ring node or to another ring or, in other words, to a node outside the ring where the indication was added. In this embodiment the indication is removed at a ring node where a breakout from the ring transport occurs.

In case of a ring topology change the added indication may be used as follows: When it is detected by one of the ring nodes that it is not possible to pass the received data packets of the data transfer to its neighbouring ring node in accordance with the added indication due to a topology change in the network, e.g. due to a link failure between two ring nodes, said one ring node which detects that it cannot pass data packets to the neighbouring ring node replaces the indication of the received data packets of the data transfer by the opposite of the two indications.

Furthermore, it is possible, when an incoming data transfer is detected by one of the ring nodes, that a ring lifetime is added to the data packets of the incoming data transfer by said one ring node. This ring lifetime may depend on the number of ring nodes in the network. In a ring topology the risk exits that packets of a data transfer circulate within the ring forever when none of the links is closed for the circulation in the complete ring. The ring lifetime may be initially set by a central control entity which controls the network with the ring topology or by a network administrator. A receiving ring node may first check whether the ring lifetime has ended. If the lifetime has ended, the detecting ring node drops the packets. If the lifetime has not ended, the detecting ring node may decrement the ring lifetime. If it is detected by one receiving ring node that the ring lifetime has ended, the data packets of the data transfer are dropped by the ring node that detects that the lifetime has ended. It is possible not to decrement the lifetime at ring entry and at ring breakout. However, it is also possible to decrement the lifetime at ring entry and ring breakout depending on how the ring lifetime is defined. By setting the ring lifetime, e.g. a TTL parameter (Time to Live), to the number of ring nodes in the ring and by decrementing the lifetime by one time unit at every hop to the next neighbouring ring node and by dropping the data packets of a data transfer at the end of the lifetime, it can be avoided that data packets circulate in the ring over a longer period of time.

It is furthermore possible that, when a topology change is detected by one of the ring nodes, said ring node transmits the information about the topology change to the central control entity. As the detecting ring node may change the added indication for incoming packets that cannot be transferred to the neighbouring ring node, a fast reaction of the ring node is assured. At the same time, when the central control entity receives the information about the topology change, the central control entity can react to the detected topology change and may determine a new ring topology.

Furthermore, it is possible that the connections to the neighbouring ring nodes are established in accordance with the configuration instructions received from the control entity controlling the ring nodes.

The indication of the ring direction may be a MPLS label. In another embodiment the indication is a VLAN identity. When applying the invention to MPLS labels, the number of labels corresponds to the number L-RAN leaves +2. This means that two labels are used in the ring. Furthermore, as the two ring labels or ring indications may be reused every ring, problems with the size of the mobile backhaul network are avoided.

The invention furthermore relates to the ring node of the network with the ring topology, the ring node comprising a non-ring port where data packets of an incoming data transfer received from a non-ring node and to be transmitted through the ring network to the destination are detected. Furthermore, a processing unit is provided configured to add an indication of a ring direction to the data packets of the incoming data transfer. The processing unit can further be configured to direct the data packets of the incoming data transfer to a ring port where the data packets of the incoming data transfer are forwarded to one of the neighbouring ring nodes based on the added indication.

The ring node may operate as discussed above in more detail.

The invention furthermore relates to a central control entity configured to control a topology change in a network having the ring topology. The central control entity contains a receiver configured to receive information about a topology change of the ring topology of the network from one of the ring nodes. The central control entity furthermore contains a database containing, for each of the ring nodes, information about possible connections of each ring node to other ring nodes of the network and about a status of the possible connections. Furthermore, a control unit is provided configured to determine which of the data transfers are affected by a topology change and configured to determine, for each of the affected data transfers, a new path through the network. Furthermore, the control unit may determine new switching instructions for ring nodes that are affected by the new path determined for the affected data transfers. The central control entity furthermore contains a transmitter transmitting the new switching instructions to the affected ring nodes. Furthermore, the control unit determines the number of ring nodes in the network and generates the ring lifetime that corresponds to the number or ring nodes. The transmitter can then transmit the ring lifetime to the ring nodes. At the ring nodes the ring lifetime can be added to the data packets of the data transfers. As mentioned above, the added ring lifetime can help to avoid the circulation of packets in the ring for a longer period of time.

The invention furthermore relates to a method for controlling the topology change by the central control entity.

BRIEF DESCRIPTION OF THE DRAWINGS

The invention will be described in further detail with reference to the accompanying drawings, in which.

DETAILED DESCRIPTION

Figure 7:
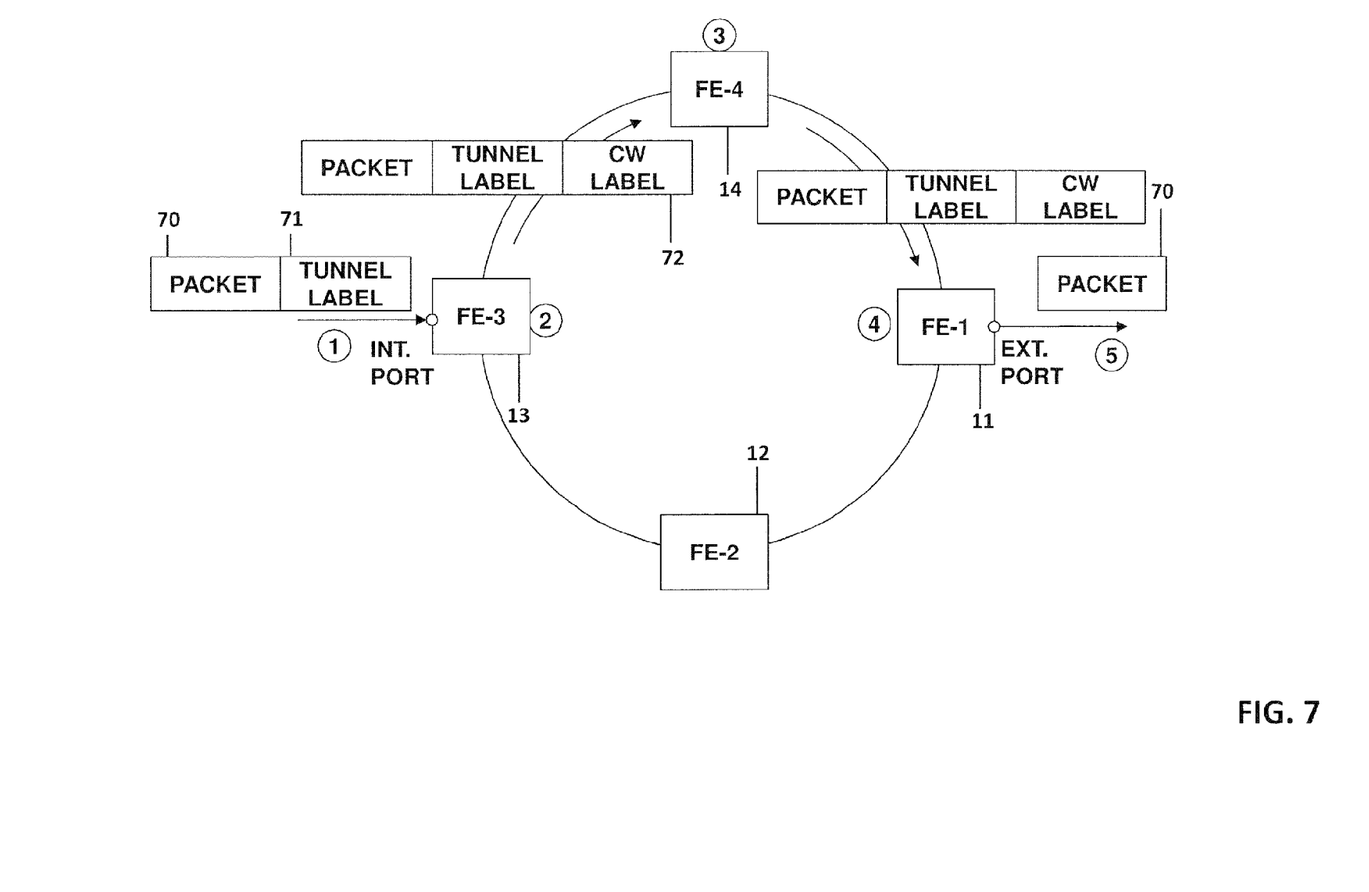
FIG. 7 shows the adding of an indication of a ring direction for an incoming data transfer according to one embodiment of the invention.

In the following it will be explained how an indication of a ring direction added as a new label helps to control the signal path in a network having a ring topology. In the following the indication is also called ring label. This ring label is pushed in front of the received packet when the packet enters the ring. However, it should be understood that the ring label may also be added to the data packet at a different position. There are two different ring labels used within the ring, one for transporting packets clockwise around the ring and the other one for the counter-clockwise transport. In FIG. 7 it is shown how data packets of a data transfer are handled for the case that no failure has happened. The data packet 70 containing payload enters the ring at forwarding element 13. By way of example the packet may be coming in from the L-RAN tree and has to be transported to the core network via the head end.

Within the ring the following mechanisms are applied: First of all, a ring label is added. There are two labels, one for each direction, clockwise (CW) and anti-clockwise or counter clockwise (CCW).

Furthermore, as will be explained in further detail below, a packet within the ring label is sent round the ring until the time to live (TTL) expires. Furthermore, a breakout from the ring transport is checked at each hop.

In the following the steps 1-5 shown in FIG. 7 will be explained in more detail. In step 1 a packet enters the ring on an internal port. The domain controlled by a central control entity, such as CE 200 of FIG. 3, covers the H-RAN (so the ring) and the L-RAN (upto to L-RAN leave). The connection between the H-RAN and the core network is an external port, as packets leave the CE domain. The connection L-RAN—H-RAN is within the CE domain, so it is an internal port within the CE domain. The packet carries a transport label identifying the destination external port. This transport label was added at the external port when entering the CE Domain. So for packets received in step 1 by FE-3 (13) the transport label was added at the L-RAN leave where the packet was received form externally. The transport label is indicated by reference numeral 71 in FIG. 7. Any data packet detected at an internal port is treated in the way discussed below.

In another embodiment the port could be an external port if the domain controlled by CE 200 only covers the ring. In this case the packet entering the ring does not carry a transport label.

In a second step forwarding element 13 sees an incoming packet on an internal non-ring port. Forwarding element 13 adds an indication of the ring direction 72, or ring label, either CW for clockwise or CCW for counter clockwise, and forwards it on the ring according to the allocated ring label. Furthermore, when different incoming data transfers are detected by forwarding element 13, the added ring labels may be added in an alternating way, e.g. for one data transfer the CW may be added whereas for the next data transfer the CCW label may be added and for the second next packet again the CW label may be added for implementing a load sharing scheme. Also other load sharing schemes are possible.

This ring label, shown by reference numeral 72 in FIG. 7 is added as a new label.

At step 3 forwarding element 14 sees an incoming packet on the ring with the CW ring label. Forwarding element 14 checks the tunnel label underneath the ring label whether to breakout from the ring transport. In the embodiment shown the breakout should occur at forwarding element 11 so that no breakout happens in forwarding element 14.

In step 4 the forwarding element 11 acts in the same way as forwarding element 14, but here breakout has to be done. As can be seen from FIG. 7, forwarding element 11 removes the ring label 72 and does the breakout. Forwarding element 11 furthermore removes the tunnel label 71 as the destination external port has been reached. In step 5 the original packet 70 is sent out on the external port. It is also possible that the tunnel label remains in front of the packet if the end of the transport tunnel has not been reached.

Figure 8:
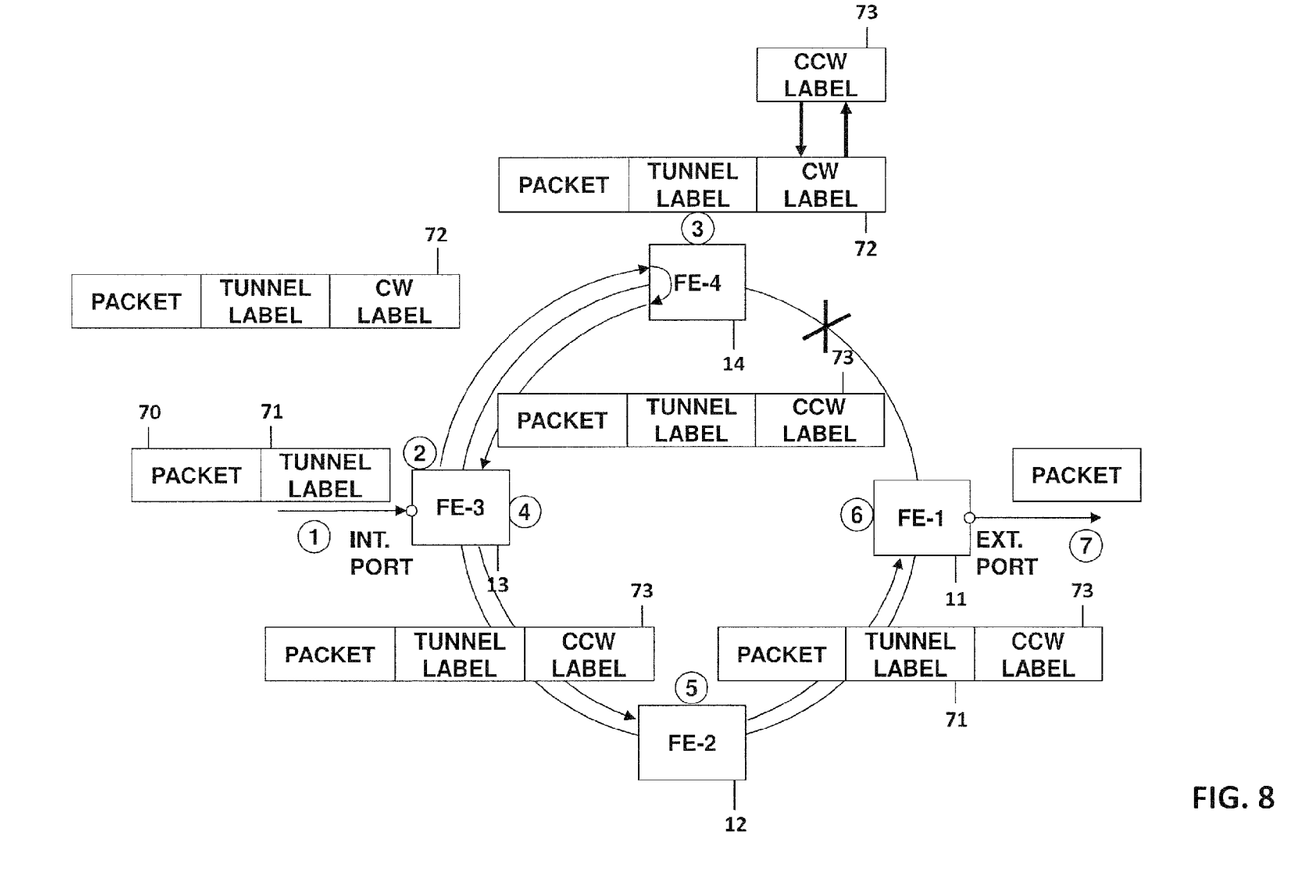
FIG. 8 shows the handling of the indication of FIG. 7 in case of a link failure.

In connection with FIG. 8 an example will be explained how a ring node reacts when a ring topology due to a link failure is detected by one of the rings. In the embodiment in FIG. 8 the link failure occurs between forwarding element 14 and forwarding element 11. Steps 1 and 2 of FIG. 8 are the same as in FIG. 7, as forwarding element 13 is not yet aware of the link failure between forwarding elements 14 and 11.

In step 3 now forwarding element 14 detects an incoming packet on the ring node with the CW ring label 72. Forwarding element 14 checks the tunnel label underneath the ring label whether to breakout from the ring transport. As in FIG. 7 no breakout in forwarding element 14 happens.

But forwarding element 14 detects that the next hop in the ring is not reachable. As a consequence, in step 3 the forwarding element 14 swaps the ring label 72 from clockwise to counter-clockwise, i.e. ring label 73. The forwarding element 14 routes the packet according to the new label 73.

In the rest of the ring the handling is unchanged, so in steps 4 and 5 the packet is transported as it was the case in step 3 of FIG. 7 based on the added ring label 73. Steps 6 and 7 then correspond to steps 4 and 5 of FIG. 7 where breakout occurs and the tunnel label 71 (if the tunnel ends at this FE 11) and the ring label 73 are removed.

Figure 12:
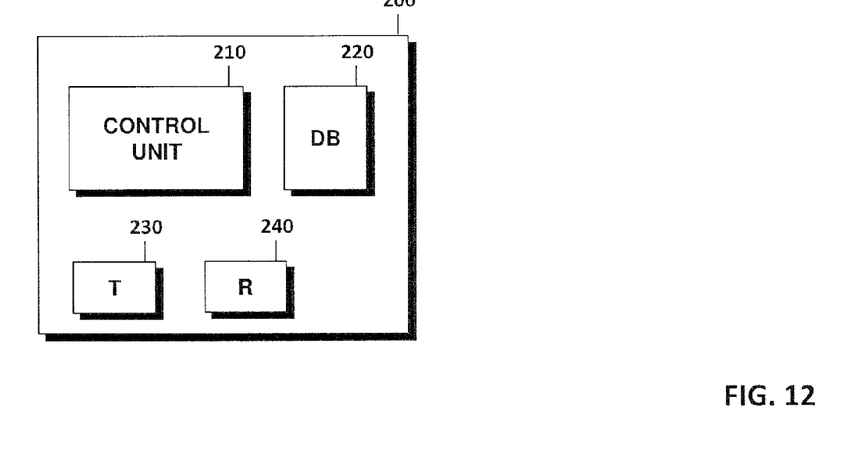
FIG. 12 shows a schematical view of the central control entity.

As can be seen from the above, this mechanism allows a fast reaction on failures in the ring, without affecting the other nodes in the ring. The swap of the ring label is based on a local detection of a link or a neighbouring node failure and is therefore very fast. When a forwarding element then detects a link or a neighbour node failure, it reports this to the central control entity 200 as shown in FIG. 4. The central control entity 200 which is also shown in FIG. 12 contains a receiver 240 where information about the topology change can be received. A control unit 210 determines new switching instructions to the ring nodes. The control unit 210 controls the data flow in the ring network. Furthermore, the central control entity 200 configures in each ring node a ring lifetime or time to live (TTL) which will be explained in further detail below. The central control entity 200 contains the database 220 where information about different ring nodes is stored. Furthermore, a transmitter 230 is provided to transmit commands to the different ring nodes, e.g. using the OpenFlow Protocol or ForCes.

Figure 9:
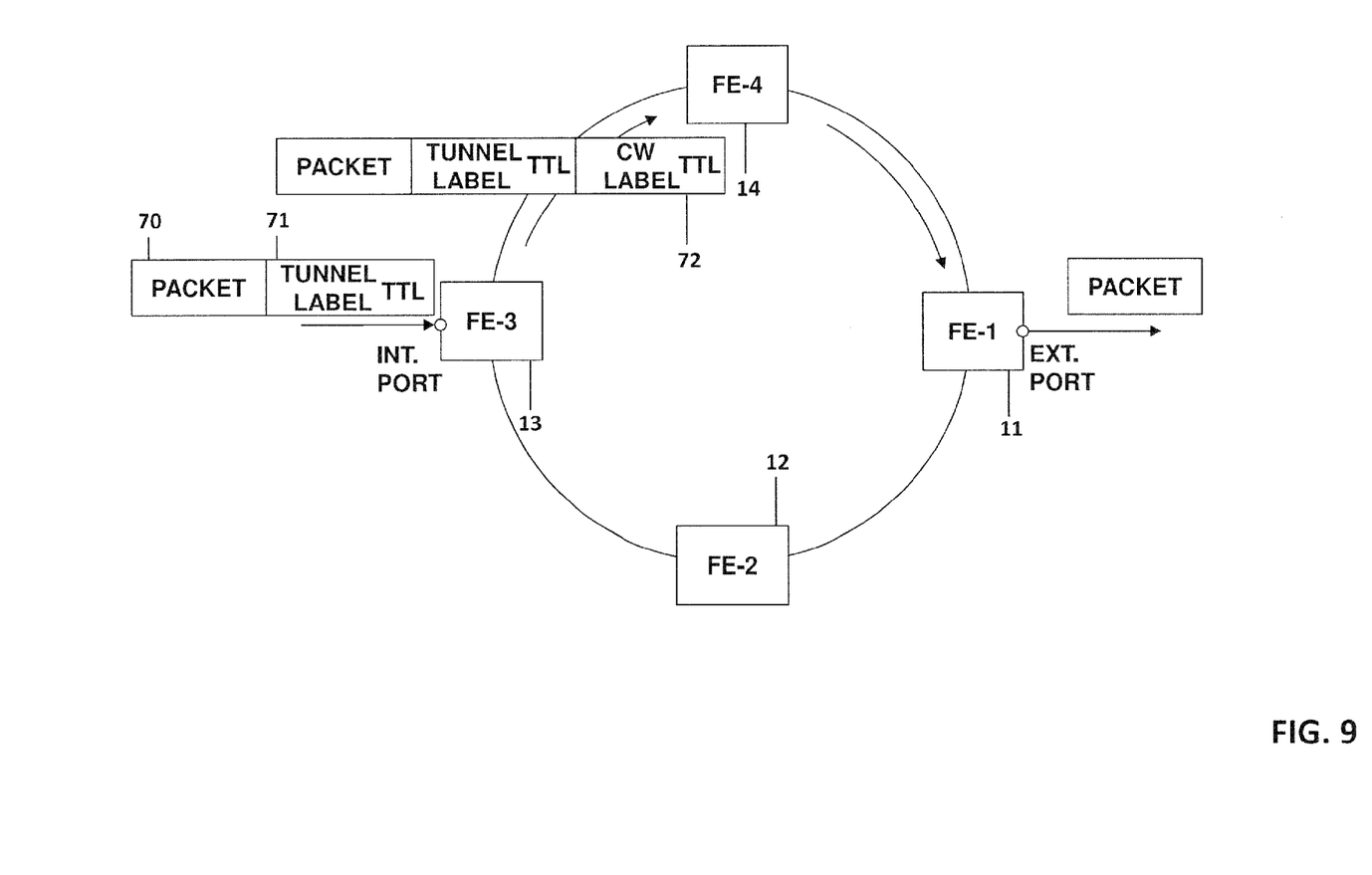
FIG. 9 shows how a ring lifetime added to the data packets in the ring is handled within the ring, FIG. 10 summarizes the step of a topology change with the use of the indication.
Figure 10:
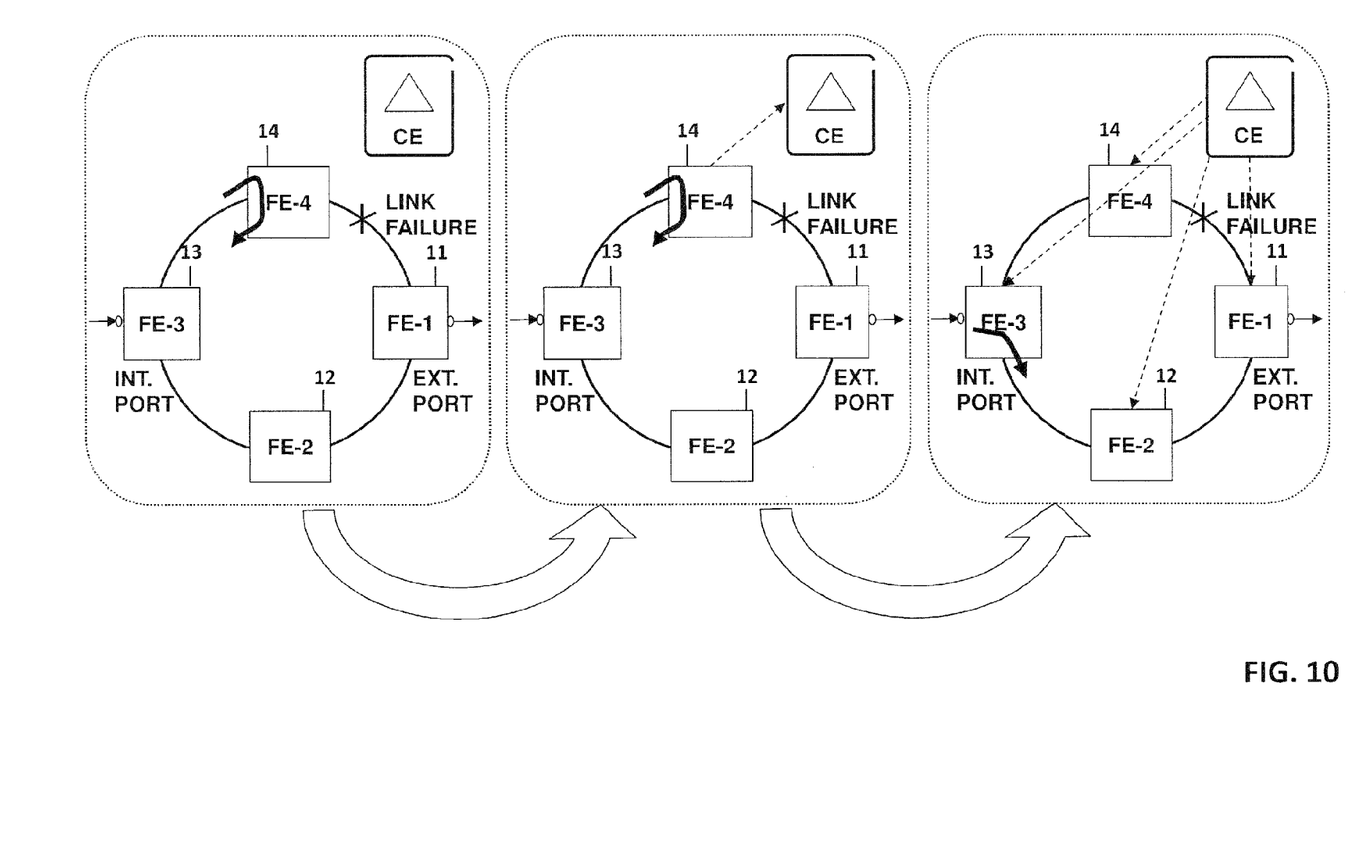
Figure 11:
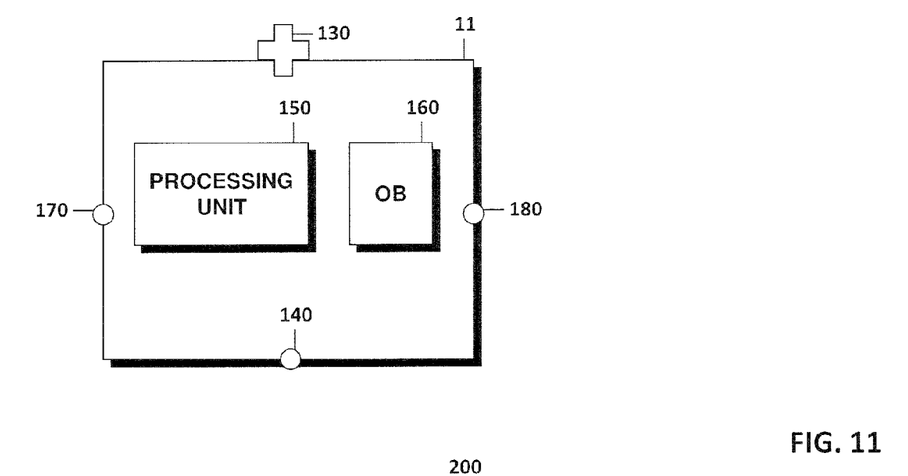
FIG. 11 shows a schematical view of a ring node.

In FIG. 11 a ring node 11 such as the ring nodes forwarding elements 11 to 14 shown in FIGS. 7-10 is shown in more detail. Such a ring node contains ring ports 170 and 180 for connecting the ring to the two neighbouring ring nodes. Furthermore, an external port 130 is provided. Through external port 130 the data packets from a node outside the area controlled by the central control entity are received. The ring node may furthermore contain other internal ports 140 which are, however, not ring ports. In these internal ports 140 packets may be received from other nodes that are also under the control of the central control entity. In the embodiment of FIG. 11, 140 is such an internal port, which is however not a ring port. The ring node 11 furthermore contains a processing unit 150 which is responsible for the operation of the ring node. By way of example when an incoming data transfer is detected from outside the ring, the processing unit 150 may add the ring label 72 or 73 and may forward it to one of the ring ports 170, 180 in dependence on the added ring label. Furthermore, a database 160 is provided where inter alia the information about the ring lifetime received from the central control entity 200 may be stored.

It should be understood that the central control entity 200 and the ring node 11 shown in FIGS. 11 and 12 may contain additional functionalities. However, for the sake of clarity only the functional entities necessary for the understanding of the present invention are shown. Furthermore, the entities shown are shown in separate entities. It should be understood that the different components shown can be incorporated in another combination of components than shown. Furthermore, the components may be incorporated by hardware and software or by a combination of hardware and software.

Referring back to FIG. 9 it will be explained how it can be avoided that data packets of a data transfers circulate in the ring forever or over a longer period of time. In the embodiment shown in FIG. 9 a ring lifetime is added to the ring label.

Each transport label bears its own TTL parameter. So there is a TTL value received with the transport label for the destination in the mobile backhaul. This TTL parameter is indicated in the label 71. As shown in FIG. 9 the ring label 72 now has a separate TTL parameter. The initial TTL value of the ring label 72 is set by the central control entity 200 when configuring the flow tables in the forwarding elements. The flow tables in the forwarding elements indicate how data packets of a data transfer are forwarded within the network. The central control entity 200 can set the initial TTL value of the ring label 72 to the number of nodes in the ring. This TTL in the ring label is then decremented by one at each transit hop in the ring. By way of example it may not be decremented at ring entry and ring breakout. However, in dependence on the fact how the number of nodes is defined, it is also possible to decrement the ring lifetime at the node where the data packets of a data transfer exit the ring. In case the ring label 72, 73 has to be replaced by a ring label 72, 73 of another direction (e.g. from CW direction to CCW direction) due to a link failure the TTL value should be reset to the initial TTL value because the number of hops will be increased.

When the TTL reaches zero or reaches the end of the lifetime, the packet is dropped. This prevents packets from going around for a too long time. At maximum there is one round trip. A packet that has not caused any breakout within one round trip would otherwise never stop going round.

In FIG. 10 the steps of a failover process are summarized. The two ring labels added to an incoming data transfer and used to transport packets either clockwise or counter-clockwise around the ring have a meaning for the forwarding elements 11 to 14 within the ring. This means, however, that a central control entity can reuse these ring labels also for other independent rings of a network. This reduces the number of additional transport labels required in a mobile backhaul.

As shown in FIG. 10 in the left part of the figure, forwarding element 14 detects the link failure and replaces the ring label by the opposite ring label, the packets being forwarded via forwarding element 13, 12 to 11 where the packet exits the ring. In the middle of FIG. 10 the forwarding element informs the central control entity about the link failure, and in the right part of FIG. 10 it is shown how the central control entity CE transmits new switching instructions to the forwarding elements 11 to 14 after having calculated a new optimum path for the data transfer through the network.

For supervising neighbouring ring nodes or links a forwarding element can use one of the following technologies: It is possible to use bidirectional forwarding detection (BFD), RFC 5580. Furthermore, it is possible to use OSPF (Open Shortest Path First) Hello on Ethernet. Additionally, connectivity fault management (CFM), IEEE 802.1ag may be used. Furthermore, fault management and performance monitoring according to ITU/TY.1731 may be used or Ethernet in the First Mile (EFM), IEEE 802.3ah.

As can be seen from the above discussion, the present invention allows a full utilization of the entire ring and there is no need to take out a certain link or segment to avoid the routing of loops. In case of a link failure a fast healing is possible based on a local decision in a forwarding element. Furthermore, an optimum adaptation of the traffic to the new situation after the failure is assured.

Furthermore, the full range of MPLS transport labels can be used for a MBH network design. Moreover, additional protection by specific TTL handling is obtained in order to avoid the going around within the ring forever. The invention furthermore helps to reduce the number of labels needed in the domain of the central entity. In addition, there is no need for a duplicated set of transport labels for failover and the ring labels can be reused in other rings for the same domain controlled by the central control entity if the rings are independent.

The invention claimed is:

1. A method for handling, by a ring node of a network having ring nodes arranged in a ring topology, a data transfer of data packets through the network via which the data packets are transmitted to a destination node, wherein each ring node has two neighbouring ring nodes, the method comprising:
   detecting data packets of an incoming data transfer received from a non-ring node to be transmitted through the network to the destination node;
   adding an indication of a ring direction to the data packets of the incoming data transfer, the indication of the ring direction indicating in which direction the data packets of the incoming data transfer are passed through the network having the ring topology;
   detecting a lack of ability to pass the received data packets of the incoming data transfer to a neighbouring ring node of one of the ring nodes in accordance with the added indication of the ring direction due to a topology change in the network;
   replacing the added indication of the ring direction of the received data packets of the incoming data transfer with a opposite indication of ring direction, in response to the detecting the lack of ability to pass the received data packets of the data transfer to the neighbouring ring node of the one of the ring nodes in accordance with the added indication of the ring direction due to the topology change in the network; and
   forwarding the received data packets of the incoming data transfer to one of the two neighbouring ring nodes based on the added indication of the ring direction or the replacing the added indication of the opposite indication of ring direction; and
   wherein when the received data packets of one of the incoming data transfer including the added indication of the ring direction are received from the one of the two neighbouring ring nodes, a check is performed based on a destination information included in the received data packets whether the received data packets of said one of the incoming data transfer should be passed to another neighbouring ring node of the one of the two neighbouring ring nodes, and
   wherein, when the received data packets should not be passed to the another neighbouring ring node of the one of the two neighbouring ring nodes, the added indication of the ring direction is removed and the received data packets of said one of the incoming data transfer are passed to a node which is not part of said network having the ring topology.

2. The method according to claim 1, wherein the added indication of the ring direction indicates whether the data packets of the incoming data transfer should pass the network with the ring topology in a clockwise or a counter-clockwise direction.

3. The method according to claim 1, wherein, when a plurality of incoming data transfers are detected, a first indication is added to the data packets of one of the plurality of incoming data transfers, wherein a second indication is added to the data packets directly following after said added first indication to the data packets of the one of the plurality of the incoming data transfers, and wherein the first indication is different from the second indication.

4. The method according claim 1, wherein, when the incoming data transfer is detected by one of the ring nodes, a ring lifetime is added to the data packets of the incoming data transfer by said one of the ring nodes.

5. The method according to claim 4,
wherein, in response to detecting by another one of the ring nodes that the ring lifetime has ended, the received data packets of the incoming data transfer are dropped by said another one of the ring nodes, and
wherein, when the ring lifetime has not ended, the ring lifetime is decremented by each of other ones of the ring nodes of the ring network.

6. The method according to claim 4, wherein the ring lifetime depends on a number of the ring nodes in the network.

7. The method according to claim 1, wherein an information about the topology change is transmitted to a central control entity controlling the ring nodes of the network.

8. The method according to claim 1, further comprising establishing transport tunnels to neighbouring ring nodes in accordance with configuration instructions received from a central control entity controlling the ring nodes of the network.

9. The method according to claim 1, wherein the added indication of the ring direction is an Multiprotocol Label Switching (MPLS)-label.

10. A ring node of a network having ring nodes arranged in a ring topology, wherein a data transfer of data packets passes the ring node on a way to a destination node, wherein each ring node of the network has two neighbouring ring nodes, the ring node comprising:
a non-ring port configured to detect data packets of an incoming data transfer received from a non-ring node to be transmitted through the ring network to a destination node,
a processor configured to perform operations comprising:
adding an indication of a ring direction to the data packets of the incoming data transfer, the added indication of the ring direction indicating in which direction the data packets of the incoming data transfer are passed through the network having the ring topology;
detecting a lack of ability to pass the received data packets of the incoming data transfer to a neighbouring ring node of one of the ring nodes in accordance with the added indication of the ring direction due to a topology change in the network;
replacing the added indication of the ring direction of the received data packets of the incoming data transfer with a opposite indication of ring direction, in response to the detecting the lack of ability to pass the received data packets of the data transfer to the neighbouring ring node of the one of the ring nodes in accordance with the added indication of the ring direction due to the topology change in the network; and
directing the received data packets to a ring port where the received data packets of the incoming data transfer are forwarded to one of the two neighbouring ring nodes based on the added indication of the ring direction or the replacing the added indication of the opposite indication of ring direction,
wherein when the received data packets of one of the incoming data transfer including the added indication of the ring direction are received from one of the two neighbouring ring nodes, a check is performed based on a destination information included in the received data packets whether the received data packets of said one of the incoming data transfer should be passed to another neighbouring ring node of the one of the two neighbouring ring nodes, and
wherein, when the received data packets should not be passed to the another neighbouring ring node of the one of the two neighbouring ring nodes, the added indication of the ring direction is removed and the received data packets of said one of the incoming data transfer are passed to a node which is not part of said network having the ring topology.

11. The ring node according to claim 10,
wherein the processor is configured to check, based on a destination information included in the received data packets, whether received data packets of the incoming data transfer received from one of the neighbouring ring nodes should be passed to another neighbouring ring node, and
wherein, when the received data packets should not be passed to the another neighbouring ring node, the processor passes the received data packets of said incoming data transfer to the non-ring port for a further transfer.

12. The ring node according to claim 10, wherein the processor is configured to add a ring lifetime to the received data packets of the incoming data transfer, the ring lifetime depending on a number of ring nodes in the ring.

13. The ring node according to claim 12,
wherein the processor is configured to initiate a dropping of the received data packets of said one of the incoming data transfer in response to detecting that the ring lifetime has ended, and
wherein the processor is configured to decrease the life time of the received data packets of said one of the incoming data transfer received from a neighbouring ring node and which are passed to another neighbouring ring node by the processor in response to detecting that the lifetime has not ended.

14. The ring node according to claim 10, wherein the ring node is a forwarding element which establishes transport tunnels to at least one of the two neighbouring ring nodes based on instructions received from a central control entity.

* * * * *